United States Patent [19]

Rao et al.

[11] Patent Number: 5,276,838
[45] Date of Patent: Jan. 4, 1994

[54] DYNAMICALLY REPOSITIONED MEMORY BANK QUEUES

[75] Inventors: Chitta L. Rao, Hyde Park, N.Y.; Steven W. White, Austin, Tex.

[73] Assignee: International Business Machines Corporation, Armonk, N.Y.

[21] Appl. No.: 664,252

[22] Filed: Mar. 4, 1991

[51] Int. Cl.$^5$ .............................. G06F 13/14
[52] U.S. Cl. .................... 395/425; 364/DIG.1; 364/238.6; 364/238.7; 364/244.3; 364/244.5
[58] Field of Search 364MS/200MS, 900MS; 395/400, 425

[56] References Cited

U.S. PATENT DOCUMENTS

| | | | |
|---|---|---|---|
| 4,293,910 | 10/1981 | Flusche et al. | 364/200 |
| 4,481,579 | 11/1984 | Kinghorn | 364/200 |
| 4,598,362 | 7/1986 | Kinjo et al. | 395/250 |
| 4,636,986 | 1/1987 | Pinkham | 365/195 |
| 4,725,945 | 2/1988 | Kronstadt et al. | 364/200 |
| 4,758,993 | 7/1988 | Takemae | 365/222 |
| 4,912,679 | 3/1990 | Shinoda et al. | 365/230 |
| 5,050,066 | 9/1991 | Myers et al. | 395/575 |

Primary Examiner—Joseph L. Dixon
Assistant Examiner—Hiep T. Nguyen
Attorney, Agent, or Firm—Floyd A. Gonzalez; Robert L. Troike

[57] ABSTRACT

A queue structure is functionally equivalent to individual FIFO bank queues but requires only slightly more hardware than the single BSM queue approach. The queue structure uses "self-advancing" WAITING queues (one per BSM) in which there is a one-to-one correspondence between a (valid) queue position and a busy bank within a given BSM. However, the position/bank relationship is dynamically managed such that positions only exist for busy banks, thereby essentially providing a FIFO queue per bank while maintaining one queue per BSM.

6 Claims, 7 Drawing Sheets

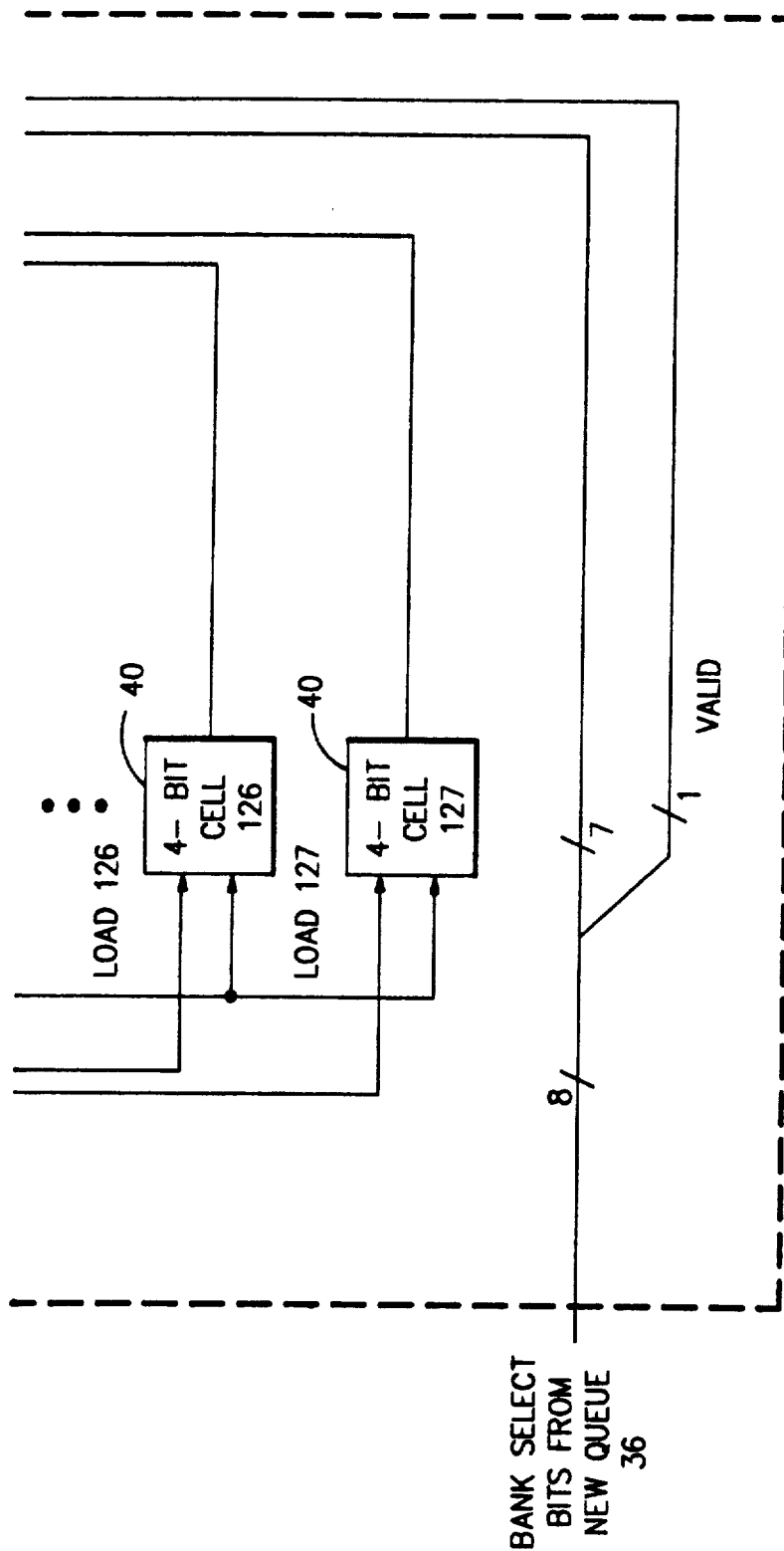

DYNAMICALLY REPOSITIONED MEMORY BANK QUEUES

BACKGROUND OF THE INVENTION

1. Field of the Invention

The present invention generally relates to data processor memory architectures and, more particularly, to a queue structure which provides the performance of individual bank queues at the approximate cost of a single basic storage module queue.

2. Description of the Prior Art

In most large data processing systems, the processor speed is many times faster than the memory cycle time. To decrease the average memory latency, the memory is typically partitioned into basic storage modules (BSMs) which are further subdivided into many banks. The effective number of BSMs limits the number of storage accesses allowed per processor cycle. The degree of banking within a BSM is determined by the ratio of memory to processor cycle times. As one example, there might be 64 BSMs with 128 banks each.

In most high-performance designs, the address bits are divided into the following fields:

| chip select and address within chip | bank select | BSM select | byte index |
| --- | --- | --- | --- |

The first three of these fields select a memory word, while the lowest-order bits select bytes within the word. In an effort to achieve a uniform distribution of storage requests across BSM units, the BSM selection field is usually the lowest-order bits which select words. The bank selection bits are the next higher-order set of bits. The remaining bits select locations within a chip and chips within a bank. For purposes of illustration, a base memory design which uses four-byte words and 64 BSMs and 128 banks in each BSM is assumed.

Since many distinct banks exist, a given request is quite likely to be destined for a "ready" bank. Queues are maintained to buffer memory requests for banks which are still busy (or active) from previous requests. IBM S/370 architectural requirements, regarding the sequence of storage references, could be satisfied by placing individual First-In-First-Out (FIFO) queues in front of each bank. In systems with a large number of banks (e.g., 128 banks in each of 64 BSMs), hardware costs make individual bank queues impractical. Therefore, a single FIFO queue per BSM is usually implemented, thus greatly reducing hardware cost at the expense of performance. When the head entry has to wait due to its required bank being active, all subsequent memory requests in the queue are also forced to wait. In a system which has many banks per BSM, most of the waiting requests are to banks which are ready. However, due to the trend of increasing memory access times, in terms of processor cycles, a single blocked entry at the head of the queue may delay many requests for many cycles.

SUMMARY OF THE INVENTION

It is therefore an object of the present invention to provide a queue structure which is functionally equivalent to individual FIFO bank queues but which requires only slightly more hardware than the single BSM queue approach.

According to the invention, there is provided a queue structure that uses "self-advancing" WAITING queues (one per BSM) in which there is a one-to-one correspondence between a queue position and a bank within a given BSM. However, the position/bank relationship is dynamically managed such that (valid) positions only exist for busy banks (which are the only ones which need queues), thereby essentially providing a FIFO queue per bank while maintaining one 16-element queue per BSM (e.g., 128 banks).

System performance is the driving motivation for the implementation of the invention. Extensive computer modelling of the switch, memory and associated queues has shown that use of the proposed queue structure (at the BSM input) drastically reduces (by about 30%) the average memory latency for a class of applications.

BRIEF DESCRIPTION OF THE DRAWINGS

The foregoing and other objects, aspects and advantages will be better understood from the following detailed description of a preferred embodiment of the invention with reference to the drawings, in which:

FIGS. 4A–4B are logic diagrams of the counters shown in FIG. 3;

DETAILED DESCRIPTION OF THE PREFERRED EMBODIMENTS OF THE INVENTION

Figure 1:
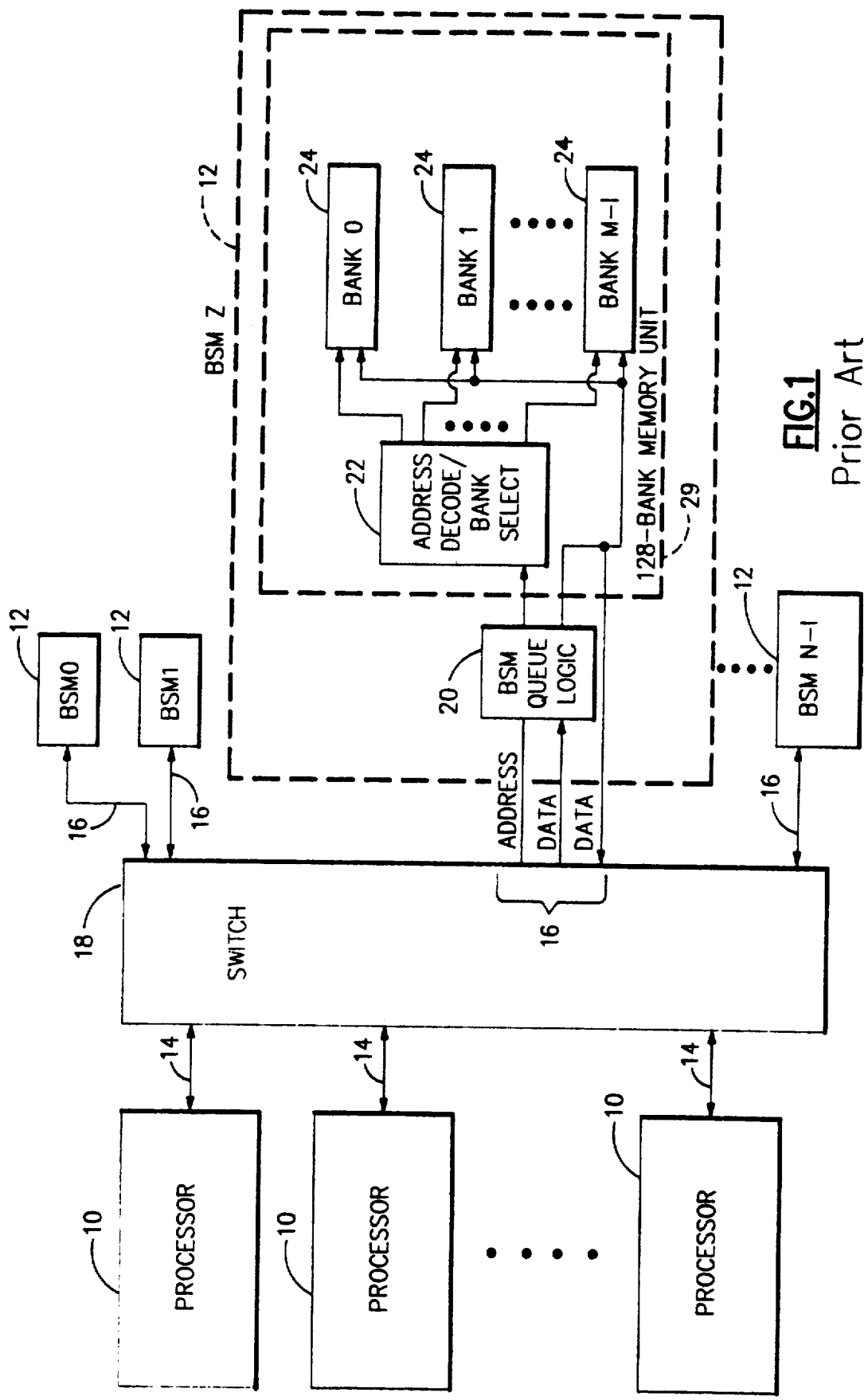
FIG. 1 is a block diagram of a memory subsystem comprised of N BSMs, each with M banks.

Referring now to the drawings, and more particularly to FIG. 1, there is shown a high-performance data processing system comprising a plurality of central processing units (CPUs) 10, each operating independently and in parallel with each other. Each of the CPUs 10 occasionally requires access to one of the several memory devices 12 (i.e., BSMs). Each CPU 10 has a path 14, and each memory device has a path 16. A CPU 10 requiring access to a memory device 12 has its path 14 connected to the path 16 of the required memory device 12 by means of a switching network 18.

An address can be partitioned into a BSM number and an address within a BSM. This BSM number is used by the switching network 18 to determine the proper connection. The "address within a BSM" is passed through the switching network without modification. In current systems, the BSM value is simply a group of address bits. The remaining bits are the "address within a BSM". This is equivalent to a greatly modified modulo $2^N$ calculation.

As shown in FIG. 1, the address within the BSM and data from the switch 18 are supplied to BSM queue logic 20 within a selected BSM 12. The address is passed to the address decode/bank select logic 22 which selects one of the M banks 24, and the data from the BSM queue logic is read into the selected bank. Conversely, data to be read out of the selected BSM is addressed in the same manner, but the data is read directly out to switch 18 to be supplied to the requesting processor 10.

Figure 2:
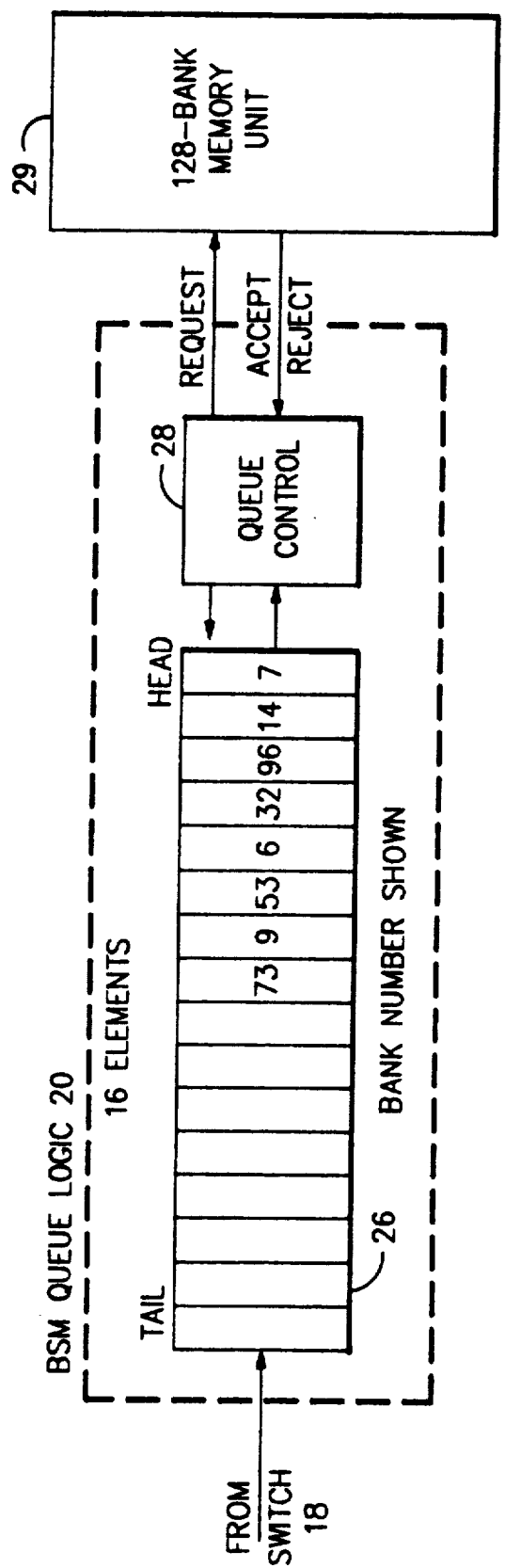
FIG. 2 is a block diagram illustrating a typical BSM queue.

FIG. 2 illustrates a typical BSM queue logic 20 for a 128-bank memory unit. The queue logic includes a FIFO register 26 comprising sixteen stages and control logic for presenting queued requests to the 128-bank memory unit. The numbers shown in the register 26 represent bank numbers for requests currently in the queue. The queue control 28 makes requests to the memory unit 29 (corresponding to the banks 24) in the order in which requests to specific banks were entered in the queue. These requests are either accepted or rejected, and the acceptance or rejection of a request is communicated back to the BSM queue. When the head BSM queue entry is accepted, all other entries in the queue are advanced one position. When the head BSM queue entry is rejected (bank busy),it is retried on the next cycle.

Figure 3:
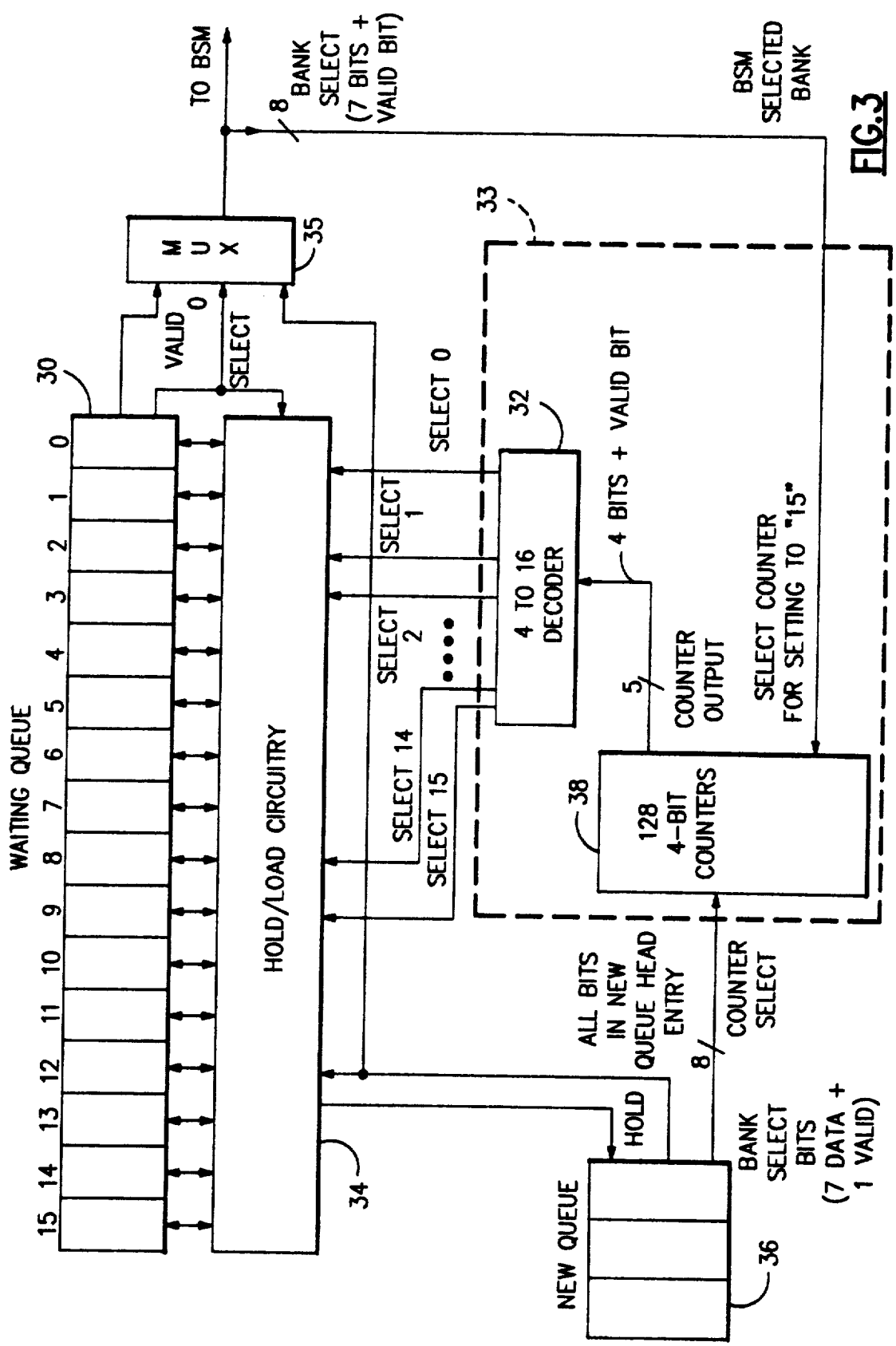
FIG. 3 is a block diagram of the memory queue according to a preferred embodiment of the invention.

In FIG. 3, there is shown a queue structure according to a preferred embodiment of the invention which would replace the BSM queue logic 20. Memory requests for banks which are currently active are routed to the "WAITING queue" 30. The number of positions in the "WAITING queue" is the same as the number of processor cycles in a memory cycle. For the purpose of this description, it is assumed that the memory/processor cycle is sixteen. This assumption determines that four bits are required for each counter used to maintain request order in the embodiment of FIGS. 4A-4B, as described below.

A memory request's position within the WAITING queue 30 indicates the number of cycles which remain in the required bank's busy cycle. During each cycle, entries in the WAITING queue 30 are shifted to the right one entry, marking the bank required by the entry as one cycle closer to being ready. In a first embodiment of the invention, a 4-to-16 decoder 32 in "bookkeeping" circuit 33 generates one of sixteen outputs $SELECT_0$ to $SELECT_{15}$ which are input to hold/load circuitry 34. Depending on which output is active, all the bits in the NEW queue 36 head entry are read into the corresponding position of the WAITING queue 30 via the hold/load circuitry 34. The decoder 32 receives as its input a 5-bit counter output, comprising four counter bits and one valid bit, from 128 4-bit counters 38 which, in turn, are controlled by eight counter select bits from the NEW queue 36. These eight bits comprise seven bits of data and one valid bit.

As mentioned, there is associated with each entry a "valid" bit which indicates the existence of a request in that position. As a valid entry in the WAITING queue 30 advances into the right-most position (slot 0), it is guaranteed that its bank is ready for a request and the request is dispatched to the memory. If the entry which is advanced to the right-most slot has a FALSE valid bit, none of the banks required by the WAITING queue entries are ready. Therefore, if a valid "new" request is available, signified by $SELECT_0$ from decoder 32 being TRUE, the new request can be serviced immediately.

Multiplexor 35 uses the valid bit from the head entry of the WAITING queue 30 to select either this entry or the head entry from the NEW queue 36 to be presented to the memory banks. Within the hold/load circuitry 34, $SELECT_0$ can be ANDed (not shown) with the valid bit of the head entry of the NEW queue 36 to prevent requests destined for busy banks from being processed. However, if the WAITING queue 30 has a request ready, a valid "new" entry will generate a HOLD signal from "hold/load" circuitry 34, which causes the NEW queue 36 to retry the request on the next cycle.

The other condition for which a HOLD signal is generated is when a NEW entry should be queued (i.e., its bank is active) and the WAITING queue 30 already has a valid entry in the position that the NEW entry would have been placed This is a rare case since it would require three requests to the same bank within the bank busy time, the first being the request for which the memory is active, the second in the WAITING queue, and the third creating the HOLD condition.

Figure 4A:
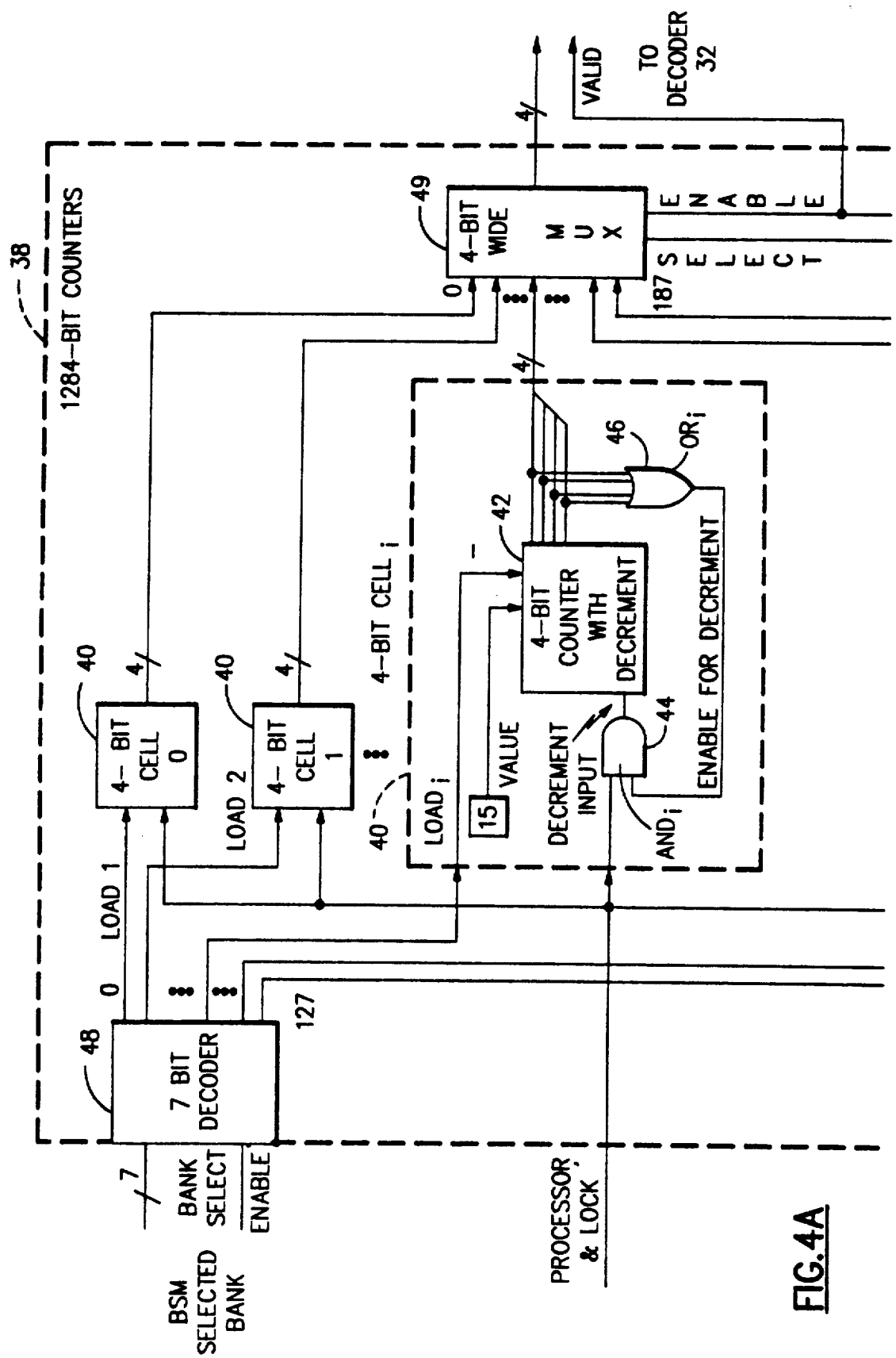

The key to this design is being able to maintain the relationship between the position of a request in the WAITING queue 30 and the number of cycles which remain in the requested bank's busy cycle. The method of maintaining the necessary bookkeeping information using a set of counter cells 40 is shown in FIGS. 4A-4B, one of which is shown in detail as including a 4-bit counter 42. These counters could be common 4-bit up/down binary counters of design similar to Signetics 74F191 or Texas Instruments SN74191. Each cycle, all of the counters with non-zero values are decremented via the processor clock through an AND gate 44. The AND gate 44 is enabled by OR gate 46 which detects a non-zero value for the counter 42. Therefore, when the counter value is zero, the decrement does not occur. A value of 15 (the number of busy cycles which remain after the cycle a bank is started) is asynchrohously loaded into the counter when $LOAD_i$ is TRUE. $LOAD_i$ is asserted by the decoder 48 when a request for $bank_i$ is accepted by the memory unit. There is a constant one-to-one relationship between a counter 42 and a bank. Thus, for a system with N banks, N counters are required. When a memory request is dispatched to a ready bank, the bank select bits are routed to the counters. This bank number is used to select the corresponding counter. Its value is set to fifteen to denote that the associated bank will be active for fifteen additional cycles. If the memory cycle is M processor cycles, the initial counter value is set so that $M-1$ decrements are required to reach zero. At any point, the counter 42 indicates the number of cycles left in the corresponding bank's busy cycle. A zero value has the special meaning that the associated bank is not active. The 4-bit output of one of the counter cells 40 is selected via a 4-bit wide by 128 multiplexor 49. The eight bank select bits which control the multiplexor 49 are derived from the NEW queue 36 (FIG. 3). These eight bits are split into seven select bits and one valid bit. The valid bit is used to enable the multiplexor 49 and is also combined with the 4-bit output of the multiplexor to provide the 5-bit counter output that is input to decoder 32 in FIG. 3.

As previously described, processor generated memory requests are routed to the appropriate BSM by switch 18 as shown in FIG. 1. The correct BSM is usually determined by examining a few of the address bits. A similar field of address bits are used within the BSM to select a bank. New memory requests routed to the BSM by the switch 18 are initially placed in the NEW queue 36. They are placed in the head entry if the queue is empty. Unless a HOLD signal is generated for the head entry, entries in the NEW queue 36 can advance each cycle. The bank select bits of the head entry are used to select the associated counter value. The counter value is decoded by decoder 32 into (at most) one of sixteen select lines. $SELECT_2$ is TRUE if the required bank has two cycles remaining in its busy cycle. If the third from the right WAITING queue entry is empty, the head entry from the NEW queue is gated into this slot. If the slot is full, the head entry in the NEW queue 36 is held and retried. The particular SELECT line which is TRUE determines which position in the WAITING queue 30 to place a new entry. SELECT$_0$ is treated as a special case, one in which the new entry is for a ready bank. If the WAITING queue 30 has no valid entry in the right most slot, the new entry is dispatched to the bank. Otherwise, the NEW queue head entry is held and retried on the next cycle.

Figure 5:
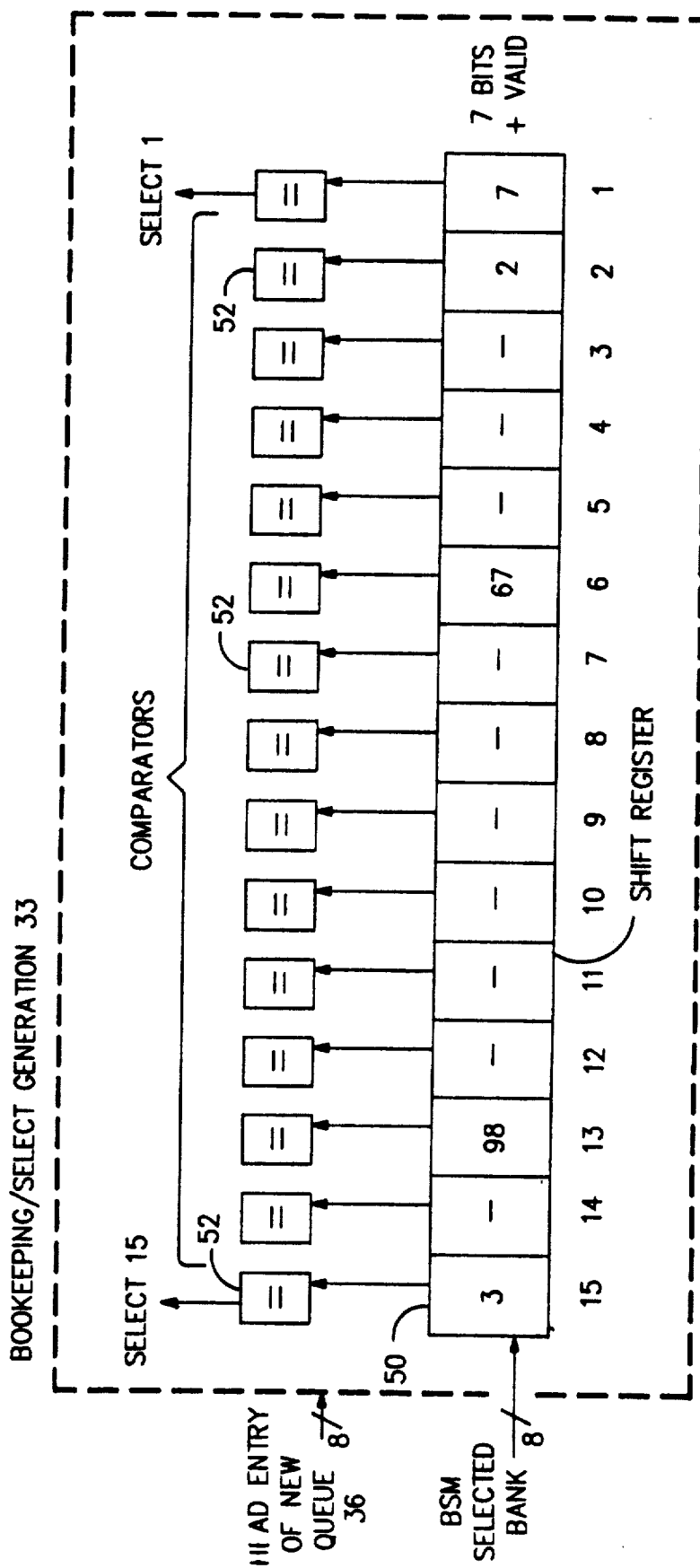
FIG. 5 is a logic diagram of an efficient implementation of the bookkeeping and SELECT line generation function.

A more efficient implementation of the bookkeeping-/SELECT line generation is a "tag" shift register 50 and a set of comparators 52 shown in FIG. 5. When the hold/load circuitry 34, WAITING queue 30, and multiplexor 35 in FIG. 3 select a request to be presented to the memory unit, its bank number (a tag) is placed in the left-most position of the shift register 50. The shift register 50 is defined to have the same number of stages as the number of cycles in a memory bank busy cycle. The shift register shifts to the right one position each cycle; however, like the WAITING queue 30, the position of the tag (or bank number) in this TAG shift register 50 indicates the number of cycles which remain in the associated memory bank's busy cycle. For example, since the value "67" is in the sixth stage in the illustrated example, bank number "67" is busy for six more cycles. Therefore, the select line generation is simply a matter of comparing the bank-select bits from the head entry of the NEW queue 36 to all of the tags in the shift register 50. If there is a match with the entry in position N, then the request is destined for a bank which will be busy for N more cycles; therefore, SELECT$_N$ should be asserted as TRUE. The WAITING queue 30, HOLD/LOAD circuitry 34, the NEW queue 36, and the remaining hardware is not affected by replacing the counters/decoder circuitry of FIGS. 4A-4B by the TAG shift register 50 and comparators 52. The inputs and outputs to the two forms of bookkeeping and SELECT line generation are the same.

Figure 6:
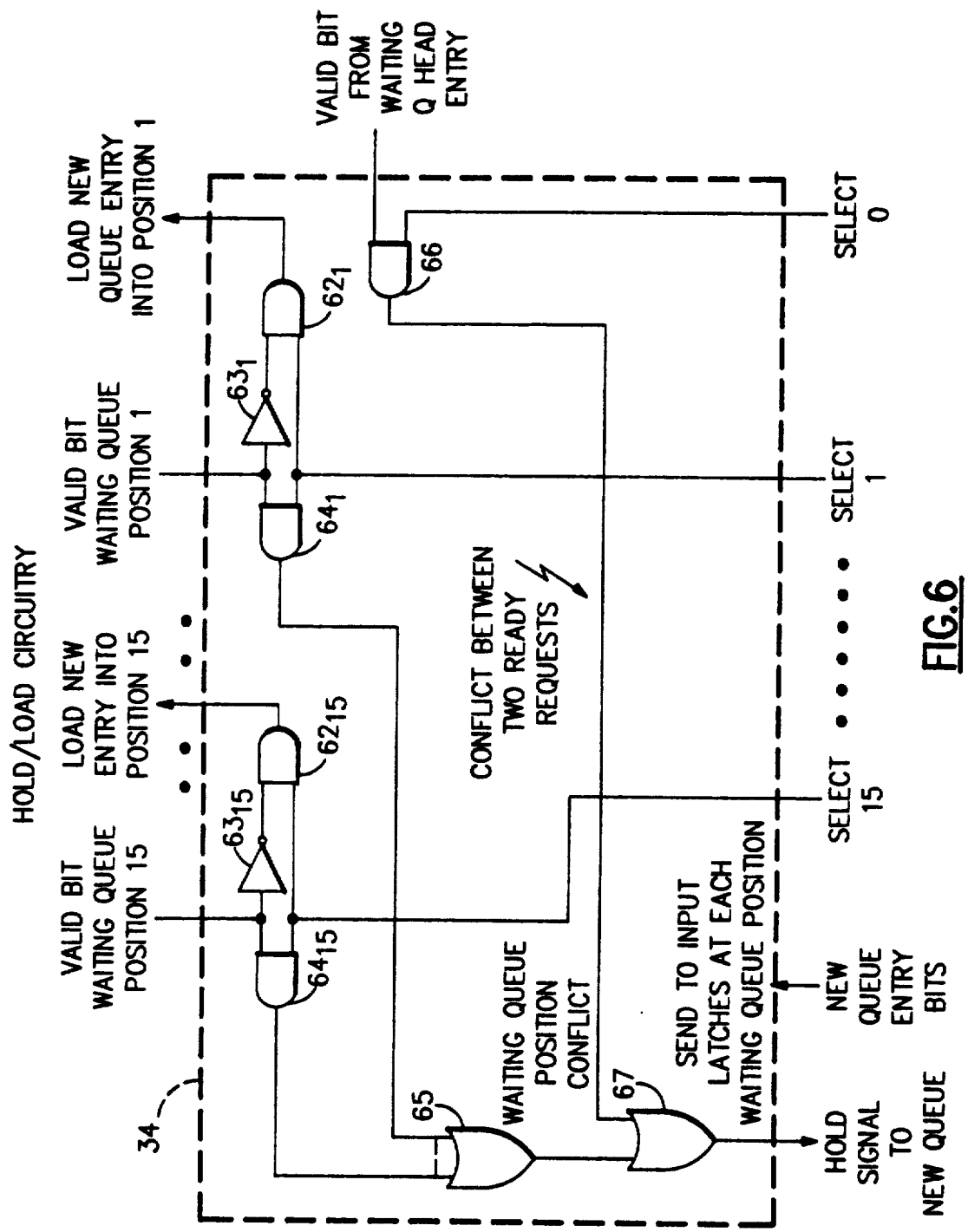
FIG. 6 is a logic diagram of the "hold/load" circuitry used in the memory queue shown in FIG. 3.

The "hold/load" circuitry 34, which is illustrated in FIG. 6, generates the HOLD signal for the head entry in the NEW queue 36 (FIG. 3) and prevents NEW entries from being loaded on top of valid entries in the WAITING queue 30. Normally, a SELECT line is used to load the new entry into the WAITING queue 30; however, if the one TRUE-valued SELECT line corresponds to a WAITING queue position that already has a valid entry, the SELECT line is prohibited from loading the NEW queue entry into the WAITING queue. In this case, a TRUE value is placed on the HOLD line.

Referring now to FIG. 6, the "hold/load" circuitry 34 accepts the sixteen decoded SELECT signals from the decoder 32 and uses SELECT$_1$ through SELECT$_{15}$ to load the NEW queue entry 36 into the WAITING queue 30. This is accomplished via AND gates 62$_1$ to 62$_{15}$, only one of which is enabled by a SELECT line. Notice that each of AND gates 62$_1$ to 62$_{15}$ also receive as an input the valid bit for the corresponding WAITING queue position via respective invertors 63$_1$ to 63$_{15}$. Thus, if the valid bit for a particular WAITING queue position i is TRUE, the corresponding AND gate 62$_i$ is inhibited, blocking the loading of the NEW queue entry into the WAITING queue.

The SELECT lines and the valid bits are also supplied to AND gates 64$_1$ through 64$_{15}$, the outputs of which are combined by OR gate 65 to generate a HOLD signal indicating a WAITING queue position conflict. Another AND gate 66 receives as inputs the SELECT$_0$ signal and the valid bit from the WAITING queue head entry and, as described above, generates a HOLD signal indicating a conflict between two ready requests. The two HOLD signals are combined in a second OR gate 67 to provide a single HOLD signal output to the NEW queue.

This queue structure according to the invention is functionally equivalent to individual FIFO bank queues. The handling, in a FIFO manner, of all requests to a given bank can be recognized by realizing that the only way a request can "pass" other requests is by circumventing requests queued in the WAITING queue. For any entry (which might be bypassed) in the WAITING queue, the associated bank counter (or position in the tag shift register) is non-zero. Therefore, if a new request (to the same bank as a request in the WAITING queue) attempts to bypass the WAITING queue entries, a non-zero counter/tag value will be found and the non-zero value indicates the position in the WAITING queue for the request that is waiting on the bank associated with this counter. Since the new entry will be sent to the WAITING queue position which already has an entry going to the same bank, the hold/load circuitry will prevent the new entry load and generate a HOLD signal. The exception to this is when the new entry is going to the same bank as the head entry in the WAITING queue 30. It will find a zero counter value, but the head WAITING queue entry is given priority (via the multiplexor 35), and the new entry will be held and thus prevented from bypassing the WAITING queue entries. Therefore, the proposed queuing mechanism provides the same function a separate FIFO queue at each bank without requiring a log of queues at non-busy banks (at most sixteen of the 128 banks for the example described can be busy at a given time) or all of the associated multiplexing/routing circuitry.

The embodiments described assume that only one request per cycle can be made to each BSM. If two requests per cycle are allowed, all of the hardware shown (except for the 4-bit counters) is simply replicated. The two requests in and the two requests out of the BSM queuing area (per cycle) can be considered as streams, each with their own WAITING queue. A 7-bit comparison between the head entries of the NEW queue 36 must be made to inhibit the NEW queue from simultaneously presenting two requests destined for the same bank. Also, a 7-bit comparison between a NEW entry going to the WAITING queue and the corresponding entry in the other WAITING queue must be made to ensure that the two WAITING queues do not both have a request that "thinks" it has a given bank "reserved". This is an easy check to make since it is known that if such a conflict occurs, the position of the existing entry in the other WAITING queue will always be indicated by the active SELECT line.

The invention provides a memory architecture which maintains request order to any given word by functionally placing a FIFO queue in front of each bank but requires only a marginal amount of more hardware than the single queue per BSM approach. Due to the one-to-one correspondence between an entry's position in the WAITING queue and the number of cycles remaining before the associated bank becomes available, FIFO order can be maintained within all requests for a given bank. However, due to the constant changes in the relationship between queue entry position and actual bank number, the WAITING queue entries are essentially dynamically repositioned to operate as FIFO queues which are placed in front of only those banks which are busy.

While the invention has been described in terms of the preferred embodiments, those skilled in the art will recognize that the invention can be practiced with modification within the spirit and scope of the appended claims.

Having thus described our invention, what we claim as new and desire to secure by Letters Patent is as follows:

1. In a data processing memory system having a plurality of basic storage modules, each of said modules being divided into memory banks, an improved queue structure which provides the performance of individual bank queues at an approximate cost of a single basic storage module queue, said queue structure comprising:
   a plurality of queue means equal in number to a number of said basic storage modules, wherein each of said queue means comprises:
   a WAITING queue means for storing memory requests for currently active memory tanks of a corresponding storage module, said memory requests being advanced within said WAITING queue means each processor cycles;
   a NEW queue means for receiving memory requests to be present to memory banks or to be queued in said WAITING queue means, said memory requests including tank select bits;
   bookkeeping means for accepting said bank select bits from a head entry of said NEW queue means for generating a SELECT output corresponding to a selected bank; and
   hold/load circuitry means responsive to said SELECT output for loading memory requests in to a selected position in said WAITING queue means if the selected position is not already occupied or presenting requests to the memory banks or generating a HOLD signal to said NEW queue means if said selected position is occupied, said NEW queue means being responsive to said HOLD signal for retrying on a next processor cycle.

2. The queue structure recited in claim 1 wherein said bookkeeping means comprises:
   a plurality of counters equal in number to a number of said memory banks in a basic storage module for each of said WAITING queue means, one of said counters being selected by said bank select bits to provide a count output corresponding to a counted value, said counted value corresponding to a number of cycles remaining in said selected bank's busy cycle; and
   decoder means responsive to said count output for generating said SELECT output.

3. The queue structure recited in claim 2 wherein said WAITING queue means includes a plurality of stages equal in number to a number of processor cycles in a memory cycle, each of said counters having a count capacity equal to said number of stages.

4. The queue structure recited in claim 1 wherein said bookkeeping means comprises:
   a TAG shift register means for receiving a bank number when a request is selected to be presented to the memory banks; and
   a plurality of comparator means equal in number to said TAG shift register means for comparing contents of said TAG shift register means with said bank select bits from said NEW queue means to generate said SELECT output.

5. The queue structure recited in claim 4 wherein said WAITING queue means includes a plurality of stages equal in number to a number of processor cycles in a member cycle and said TAG shift register means has a plurality of stages equal in number as a number of cycles in a memory bank busy cycle and being shifted once each cycle.

6. The queue structure recited in claim 1, wherein said bookkeeping means includes TAG shift register means for receiving a bank number when a request is selected to be presented to the memory banks, said TAG shift register means including a plurality of stages equal in number to a number of cycles in a memory bank busy cycle.

* * * * *